United States Patent
Pihlajamaki et al.

(10) Patent No.: US 10,348,653 B2
(45) Date of Patent: Jul. 9, 2019

(54) SCHEDULING OF PRESENCE INFORMATION TRANSFER

(71) Applicant: TeliaSonera AB, Stockholm (SE)

(72) Inventors: Antti Pihlajamaki, Espoo (FI); Frans Tuomela, Helsinki (FI); Tero Jalkanen, Tuusula (FI)

(73) Assignee: TELIA COMPANY AB, Stockholm (SE)

( * ) Notice: Subject to any disclaimer, the term of this patent is extended or adjusted under 35 U.S.C. 154(b) by 135 days.

(21) Appl. No.: 14/132,779

(22) Filed: Dec. 18, 2013

(65) Prior Publication Data
US 2014/0173007 A1    Jun. 19, 2014

(30) Foreign Application Priority Data
Dec. 19, 2012    (EP) .................................... 12197950

(51) Int. Cl.
*H04M 3/42*    (2006.01)
*H04W 4/02*    (2018.01)
*H04L 12/58*    (2006.01)

(52) U.S. Cl.
CPC ............ *H04L 51/02* (2013.01); *H04L 51/043* (2013.01); *H04M 3/42374* (2013.01); *H04W 4/027* (2013.01); *H04W 4/02* (2013.01)

(58) Field of Classification Search
CPC ... H04L 12/28; H04L 12/581; H04L 12/1822; H04L 41/06; H04L 41/12; H04L 41/026; H04L 45/00; H04L 51/04; H04L 51/043; H04L 12/26; H04L 45/14; H04L 47/10; H04L 51/06; H04L 63/105; H04L 67/24; H04L 12/5815; H04L 51/02; H04L 65/601; H04L 65/1016; H04L 65/1059;
(Continued)

(56) References Cited

U.S. PATENT DOCUMENTS 7,843,843 B1 * 11/2010 Papp, III ................. H04L 12/26
370/252
8,078,191 B2    12/2011 Laflamme et al.
(Continued)

OTHER PUBLICATIONS

European Search Report, dated May 14, 2013, from corresponding European application.
(Continued)

*Primary Examiner* — Sargon N Nano
*Assistant Examiner* — Michael Li
(74) *Attorney, Agent, or Firm* — Young & Thompson (57) ABSTRACT

The invention relates to a method for triggering a transfer of at least one presence information message between the network node and a client terminal. In the method the network node is configured to receive information on a communication environment from at least one of the following: the communication network, the client terminal. The received information is analyzed at least by comparing information on the communication environment at least partially with at least one predetermined value. If the comparison indicates that the communication environment is suitable for the transfer of the at least one presence information message, the transfer of the at least one presence information message is triggered to the client terminal. The invention relates also to a network node and a system for implementing the method.

20 Claims, 2 Drawing Sheets

(58) Field of Classification Search
CPC ....... H04L 67/10; H04L 67/14; H04L 67/325; H04L 41/00; H04L 65/1073; H04L 67/16; H04M 3/5191; H04M 3/42374; H04W 4/02; H04W 4/027; H04W 72/048; H04W 4/00

See application file for complete search history.

(56) References Cited

U.S. PATENT DOCUMENTS

| | | | |
|---|---|---|---|
| 9,124,439 B1* | 9/2015 | Li | H04L 12/28 |
| 2005/0108387 A1* | 5/2005 | Li | H04L 41/026 709/224 |
| 2005/0141479 A1* | 6/2005 | Ozugur | H04L 12/581 370/351 |
| 2005/0232184 A1 | 10/2005 | Borella | |
| 2008/0133738 A1* | 6/2008 | Knauerhase | H04L 51/04 709/224 |
| 2008/0281902 A1* | 11/2008 | Kaminsky | H04L 41/0609 709/203 |
| 2009/0316681 A1* | 12/2009 | Hehmeyer | H04L 45/00 370/351 |
| 2010/0235423 A1* | 9/2010 | Lee | H04L 67/24 709/202 |
| 2011/0087791 A1* | 4/2011 | George | H04L 67/16 709/229 |
| 2011/0280196 A1* | 11/2011 | Maggenti | H04W 72/048 370/329 |
| 2012/0226797 A1* | 9/2012 | Ghosh | H04L 51/043 709/224 |
| 2014/0181312 A1* | 6/2014 | Rutten | H04L 65/1016 709/227 |

OTHER PUBLICATIONS

European Office Action, dated May 24, 2018 for Application No. 12 197 950.

* cited by examiner

FIG. 4 ural text

SCHEDULING OF PRESENCE INFORMATION TRANSFER

TECHNICAL FIELD

The invention concerns in general the technical field of telecommunications. Especially the invention concerns aspects relating to a presence service.

BACKGROUND OF THE INVENTION

Wireless communication was traditionally based on the idea of enabling voice communication to and from a mobile terminal residing in the coverage of a mobile communication network. The communication channel was established over circuit-switched technology. However, a packet-switched technology was later introduced for improving the efficiency in utilization of the capacity of a mobile communication network. As the data is delivered in packets between the parties there is no need to reserve the whole communication channel for a specific connection. Additionally, some other benefits may be achieved with packet-switched technology, such as those relating to error correction.

The packet-switched technology also enabled a whole range of new services. One reason is that wide range of enterprise and commercial applications are based on IP (Internet Protocol) and thus they can be almost directly imported into the mobile terminals residing in the packet-switched mobile communication network. Examples of such services are so called IP (Internet Protocol) messaging and other communication related to services such as SIP (Session Initiation Protocol), IMS (IP Multimedia Subsystem) and RCS (Rich Communication Suite).

On the other hand, since the services as described above have been adopted by the users of mobile terminals it has brought out another challenge. Namely, the use of the services causes a lot of traffic in a mobile communication network. For example, a presence service by means of which a user can deliver e.g. his/her status information to other parties is very popular. The provision of the presence service is carried out with so called presence server or presence proxy which may be configured to maintain status information of the users or a group of users or relay the information between user terminals. The status information of a user maintained in the presence server is visible for at least limited group of other users. In the case of a presence proxy the information is not stored in the proxy but instead it controls the presence traffic flowing between the terminals and controls it. The visibility may be controlled by the user through an application installed in the mobile terminal of the user. As can be directly seen the updates with respect to users' status may cause challenges for the network as well as the presence server or presence proxy due to the amount of traffic, especially when taking into account the traffic caused by other services.

There has been developed some methods to control the traffic caused by presence services. For example, document U.S. Pat. No. 8,078,191 B2 discloses a proposal for reducing network traffic in the context of presence services. One idea is to postpone the delivery of status updates by a network node until a client especially requests for updates. Alternatively, the network node may accumulate the changes and deliver the presence updates when the final state for each presence attribute is received. This relates to a solution in which there are multiple attributes with respect to the presence information.

However, the known solutions are not widely in use. Typically the known solutions provide only a partial solution i.e. the solution is only for the mobile terminal or the network side. Additionally, the solutions are not implemented by mobile terminal vendors or deployed by telecom operators for one reason or another. Generally speaking none of the known solutions take into account the changes in the network environment. More specifically, the status of the client terminal or the congestion of the network is not anyhow taken into account in the known solutions.

SUMMARY OF THE INVENTION

An objective of the invention is to present a method, a network node and a system for managing a transfer of presence information. Another objective of the invention is that the method, the network node and the system take into account a communication environment in a context of presence information service.

The objects of the invention are reached by a method, a network node and a system as defined by the respective independent claims.

According to a first aspect, a method for triggering, by a network node, a transfer of at least one presence information message between the network node and a client terminal is provided wherein the network node and the client terminal are configured to communicate with each other over a communication network, and wherein the method comprises the steps of receiving information on a communication environment from at least one of the following: the communication network, the client terminal, analyzing the received information at least by comparing information on the communication environment at least partially with at least one predetermined value, and triggering the transfer of the at least one presence information message to the client terminal in response to the comparison if the comparison indicates that the communication environment is suitable for the transfer of the at least one presence information message.

The information on the communication environment with respect to the communication network may be received from a network element maintaining network status information in a communication network. Alternatively or in addition, the receipt of information from the network element maintaining network status information in the communication environment may be achieved in response to a request of the information by the network node.

The information on the communication environment with respect to the communication network may comprise at least one of the following: an activity status of the client terminal stored in the communication network, congestion status of the communication network, a quality of communication channel, a radio access technology the client terminal is currently utilizing, a roaming status of the client terminal in the communication network.

The transfer of at least one presence information message to the client terminal may be triggered according to priority order of presentities, wherein the priority order of the presentities may be maintained in the network node on the client terminal basis.

The method may further comprise a step of comparing a first indicator in first presence information message to a second indicator in at least one second presence information message in order to transfer the presence information messages in a priority order by the network node.

The at least one presence information message with a certain predetermined priority level may be configured to be transferred under a predetermined communication environment.

Further, the information on the communication environment with respect to the client terminal may comprise at least one of the following: user profile set in the client terminal, time of day, type of communication network into which the client terminal is attached, movement of the client terminal, type of the movement of the client terminal, status of a screen lock of the client terminal, status of a Wi-Fi radio in the client terminal, location of the client terminal, battery status of the client terminal.

According to a second aspect, a network node comprising a processor, a memory including at least one portion of computer program code and a communication interface is provided wherein the memory and the at least one portion of computer program code are configured to, with the processor and communication interface cause the network node to receive information on a communication environment from at least one of the following: the communication network, the client terminal, analyze the received information at least by comparing information on the communication environment at least partially with at least one predetermined value, and trigger a transfer of at least one presence information message to the client terminal in response to the comparison if the comparison indicates that the communication environment is suitable for the transfer of the at least one presence information message.

The transfer of the at least one presence information message to the client terminal may be triggered according to priority order of presentities, wherein the priority order of the presentities may be maintained in the memory of the network node on the client terminal basis.

In addition, the network node may further be configured to compare a first indicator in a first presence information message to other indicator in at least one second presence information message in order to transfer the at least one presence information message in a priority order by the network node.

The network node may further be configured to transfer at least one presence information message of a certain predetermined priority level under a predetermined communication environment.

According to a third aspect, a system comprising a network node, one or more client terminals exchanging presence information in the system with the network node and a communication network is provided wherein the network node is configured to receive information from at least one of the following: the communication network, the client terminal, analyze the received information at least by comparing information on the communication environment at least partially with at least one predetermined value, and trigger a transfer of at least one presence information message to the client terminal in response to the comparison if the comparison indicates that the communication environment is suitable for the transfer of the at least one presence information message.

Furthermore, the communication network may comprise a network element for maintaining information on the communication environment in the communication network side.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

The need to provide wireless presence-based services, which take into account a communication environment relating to a client terminal and/or a mobile communication network, is addressed by the invention and its embodiments. In general, a network node, such as a presence server, is configured to receive updates relating to presence information of a user i.e. presentity according to established practice. The presentity delivers the presence information through a client terminal either manually or automatically. The manual delivery of the presence information shall be understood to refer any user initiated actions by means of which the presence information can be adapted to. The automatically delivered presence information, in turn, refers to such procedures, which are implemented in the client terminal and which do not require any input from the user of the client terminal, but which automatically take care of the monitoring and delivery of the presence information according to any predetermined rule. In this context it is not made any difference on manually or automatically delivered presence information unless otherwise mentioned.

Figure 1:
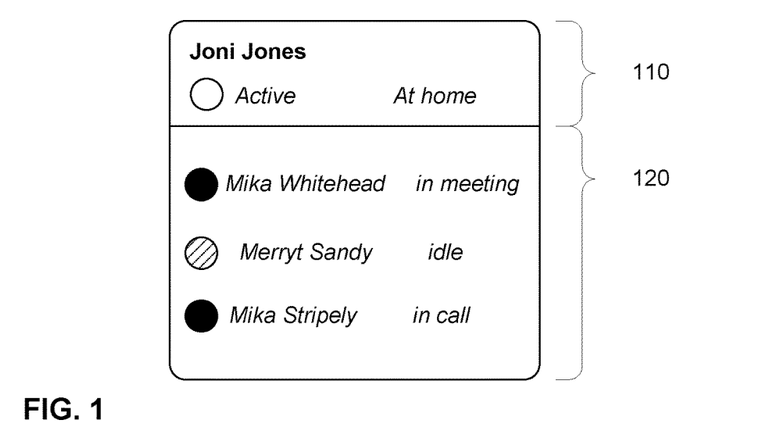
FIG. 1 illustrates an example of presence information in a presence service.

FIG. 1 illustrates an example of presence information, which is provided to a user of the service. In this case the user whose presence information interface shown is Joni Jones. His own information, which is visible for at least some other users i.e. watchers according to established practice, is referred with number 110. The presentity is allowed to change the presence information or it can be configured that at least some automatically implemented adjustments are allowed. Further, the presence information interface may disclose presence information for contacts of the presentity 120. In this example, Joni Jones has three contacts: Mika Whitehead, Merryt Sandy and Mika Stripely. As can be seen from FIG. 1 the presence information interface may comprise some kind of symbol, like a circle with different color scheme, to indicate the status of each of the contact. Some additional information, such as a location or a situation in which the contact in question is, may also be provided to the presentity and is often referred to as social presence information. In FIG. 1 such information is referred with terms: at home, meeting, idle and call. The information provided in the presence information interface may vary a lot from what is disclosed in FIG. 1. For example, in some cases the information provided may contain some presentity's health related information, which is measured from the presentity and delivered to the presence service through a client terminal.

The client terminal comprises application software running in the terminal, which enables a monitoring and maintenance of presence information in the client terminal. The application software is configured to, with a help of hardware of the client terminal, communicate with a network node residing in a network. The network node comprises corresponding application software relating to monitoring, relaying and maintenance of presence information which software is, at least partly, executed in the network node by at least one processing unit. The network node may also be arranged to communicate with one or more network elements residing in a network, such as a mobile communication network, in order to transfer information between the network node and a network element. The information transferred may be used in the presence service.

Figure 2:
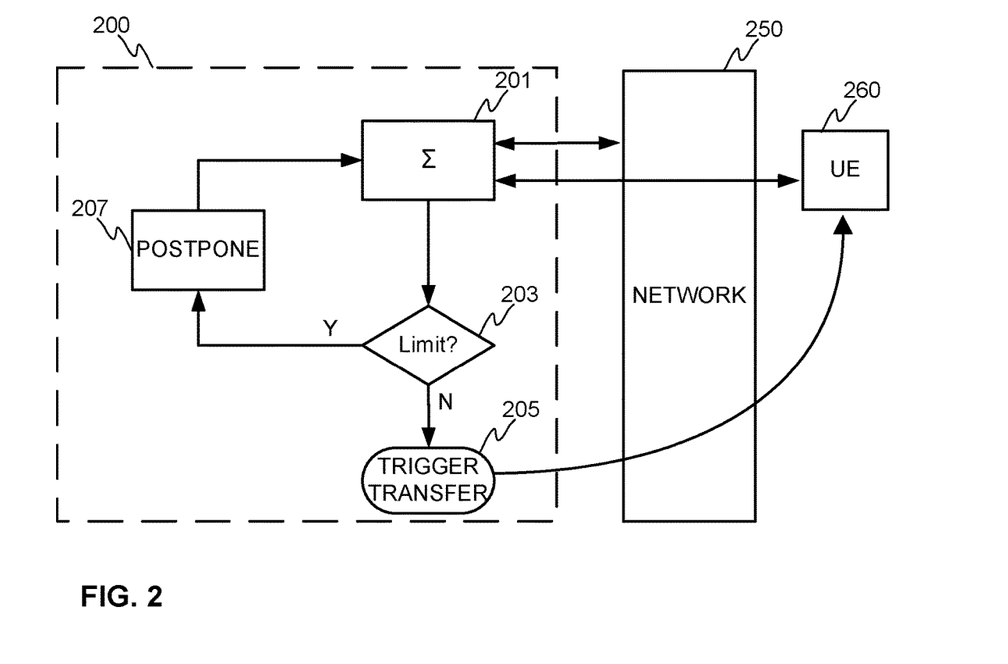
FIG. 2 illustrates an example of the method according to the invention.

FIG. 2 illustrates the principle of the method according to the invention performed in the network node 200. The network node 200 is configured to communicate with and receive information on the communication environment from at least one of the following: network 250, client terminal (UE) 260. The client terminal 260 is configured to deliver the information over a communication network 250, such as mobile communication network. The client terminal referred with 260 is here a watcher. The network node 200 may either actively request the information or receive it automatically under predetermined rules. The information received represents the communication environment i.e. one or more client terminals 260 and a communication network 250. As the network node 200 receives information on the communication environment it is configured to analyze 201 it. The analysis may consist of categorizing the received information, performing mathematical operations, such as weighting, to the pieces of information, for instance. As the received information is analyzed 201 the result, or at least one or more values derived in the analysis, representing the communication environment may be compared 203 to predetermined values i.e. limits. As a result of the comparison 203, the network node 200 at least either concludes if the communication environment is applicable for a transfer of information or not.

As the network node 200 is configured to collect and maintain presence information relating to clients of the presence service, the delivery of the information i.e. one or more presence information messages may be arranged on a basis of the comparison 203. If the network node 200 is able to determine that there is no obstacle to deliver one or more presence information messages to the client terminal 260, it is configured to initiate, i.e. trigger, the transfer of the at least one presence information message 205 over the communication network 250. For clarity reasons it is not disclosed here that the network node 200 comprises a memory for storing the presence information messages, which may be fetched from the memory for the watcher in order to trigger the transfer of the messages 205. On the contrary, if the comparison 203 indicates that the at least one presence information message from the network node 200 towards one or more watchers is not allowed, or recommended, the network node 200 may postpone 207 the transfer of presence information messages. It may be arranged that the network node is configured to start the procedure from the beginning after a predetermined period of time by communicating with the mentioned entities i.e. with the network 250 and/or with the client terminal 260. Alternatively, it may be arranged that after the postponement 207, the network node 200 is configured to trigger the transfer of the at least one presence information message 205 without analyzing the communication environment again according to predetermined rules. This alternative is not illustrated in FIG. 2. FIG. 2 does not disclose how the network node 200 is configured to receive and store messages relating to presence information of presentities as it is a known from existing presence services. The triggering of transfer of presence information messages shall be broadly understood to cover the initiation of the transfer, but also the transfer itself if applicable in the context.

The network node 200 may reside in the network 250 as depicted in FIG. 2 or it may be arranged to communicate either directly or indirectly with the network 250 and/or the client terminal 260. The network node may also reside in some other network, which is accessible at least for communication from the network 250 and with the client terminal 260.

The method according to an example of the invention may be improved by weighting different elements in the analysis. As the network node 200 is configured to receive information from the network 250 and/or the client terminal 260 it is possible to emphasize either of these origins of information. For example, if it is essential, for one reason or another, to prioritize information received from the network 250, an overweighting factor may be set for that information. Furthermore, information from the client terminal 260 may be underweight. As a result, the information representing the communication environment is overweight by the network information and the result is to be compared to a predetermined value, i.e. limit, for concluding if it is possible to transfer the presence information messages or not. Similarly, the weighting can be arranged in such a manner that the information from the client terminal 260 may be overweighed and the information from the network 250 underweighted, or both of the information is equally weighted. As each of the information representing the status in the network 250 and the client terminal 260 may comprise multiple parameters representing the status in each of the entities, it is also possible to give overweighting for at least one of the monitored parameters. In such a manner, e.g. depending on the situation, it is possible to increase importance of some factors representing the communication environment in either the network or the client terminal end.

As one of the aims of the invention is to optimize traffic originating from the presence service the monitoring of statuses in the communication environment is required. The information is utilized in the context of the delivery of the presence information. The monitoring may relate to the automatic monitoring of the client terminal 260, i.e. a watcher, with means implemented in the client terminal 260, which gives indication of the user activities without any input from the user. Generally speaking the term monitoring shall be interpreted to comprise any user initiated input with respect to presence information, such as changing the status in the presence service from one state to another, or any automatically detected status of the client terminal 260. The delivery of any message of presence information to the client terminal, i.e. watcher, may be scheduled on a basis of predetermined criteria. The analysis if the predetermined criterion or criteria is met may be analyzed in the network node 200. Such predetermined criteria may e.g. relate to user preferences set by the user of the client terminal, any status information of the client terminal, location of the client terminal. More closely, criteria relating to user preferences, which at the same time represents the communication environment in the client terminal 260, may be at least one of the following:

- Preference relating to a battery life of the client terminal,
- User profile set in the client terminal,
- Time of day
- Type of cellular network into which the client terminal is attached (2G, 3G or LTE)

Correspondingly, the information representing the communication environment of the client terminal 260 may be at least one of the following:

- Information on the movement of the client terminal from any internal sensors; type of movement (i.e. is the terminal currently actively being used or just sitting idly somewhere)
- Is a screen lock set on or off
- Is a Wi-Fi radio in the client terminal set on or off
- Location of the client terminal
- Battery status of the client terminal Furthermore, the location of the client terminal may be determined with at least one of the following manner:

- With an internal positioning means, such as GPS
- Internal acceleration sensors and similar in the client terminal utilized for positioning i.e. dead reckoning
- Information on a serving base station in the mobile network and/or Wi-Fi and any change in that determined in the client terminal The above listed items are only examples and the criteria possible to be applied here in order to receive relevant information for detecting, if presence information message delivery shall be initiated, may vary. By adjusting characteristics of a criterion and/or number of criteria used for the detection it is possible to set the triggering for the delivery of presence information from a first level to another.

For example, the application software relating to presence information service may comprise portion of software code, which is configured to take into account the battery status in the client terminal. The application software may either arrange a measurement of the battery status and analyze it, or alternatively receive and analyze the information from any other application running in the client terminal. When analyzing the information the application software may comprise predetermined limits into which the battery level information is to be compared. If the battery charging level is e.g. half of its maximum, the presence application software may be configured to deliver indication to the network node 200 that the communication environment in the client terminal side, i.e. in the watcher side, is not optimal for a delivery of presence information. The information is configured to be analyzed in the network node 200 and the delivery of at least one presence information message may be postponed, for example.

Another example of the invention is that an application software, when monitoring the activity of the user, detects that the screen lock of the client terminal is set on and the client terminal has not moved anywhere within a time period exceeding a predetermined limit. The application software may be configured to deliver this information to the network node 200, which is configured to analyze the information and determine an optimal schedule of the presence information messages on the basis of this information.

The application software which is configured to be running in the client terminal may also be arranged to, at least partly, analyze information determined in the client terminal and deliver a pre-agreed indication of the result of analysis to the network node. The network node is configured to operate on the basis of the received indication with respect to presence information.

Similarly, the monitoring of communication environment may be performed in the network side, which monitoring is controlled by the network node taking care of the presence service in the network side. Presence application software is configured to be run in the network node by means of which the network node receives and transmits one or more messages of presence information from and to client terminals. Information on the presence information is maintained in a memory of the network node according to a predetermined data structure. The network node may also comprise necessary means, implemented e.g. by portions of computer software, by means of which it is possible to maintain access rights into different information in a user basis. In other words, it is possible to set restrictions for different users or user groups for an access to presence information. In practice, the access restrictions may e.g. be arranged by requesting credential information from the users, such as user name and password, when setting up the presence service.

In order to optimize the traffic relating to presence service between the client terminals and the network node it is also possible to determine triggers, which take into account the communication environment in general. For example, the network node 200 may be arranged to request a permission from a network element managing the traffic in the communication network to transfer the presence information message. The request may relate to a transfer of at least one piece of presence information, which causes traffic in the network. In response to the permission request the network element may check the traffic volumes in the network in general and if the traffic is below a predetermined level, permission is given to the network node to transfer the presence information message. The network element may be a MSC (Mobile Switching Centre), for instance. Some other items to be used, e.g. analyzed, for optimizing a schedule for the presence information message may be the following:

- Check of the status of the client terminal stored in the communication network i.e. if the client terminal is in e.g. idle mode,
- Congestion status of the communication network in general and/or the cell the client terminal is camped,
- Quality of communication channel (such as QCI value currently being used by the terminal session),
- Radio access technology the client terminal is currently utilizing,
- Roaming status of the client terminal wherein the information is stored in the communication network.

According to an example of the invention at least one of the mentioned pieces of information, or an indicator of it or them, may be used for understanding the communication environment from the communication network point of view.

There are several approaches, how and when the network status, i.e. environmental issues, can be taken into account in the context of presence information messages. One situation is that the network node has received a number of presence information messages from at least one client terminal, but which are not, at one point of time, yet transferred to other users. It may be defined that the network node is configured to transfer the presence information message periodically or aperiodically, or when a certain preset condition is fulfilled, such as the network node has received a predetermined number of messages, which are not yet delivered. In some implementation the conditions may be set for a certain group or only to certain users of the service. When the condition is fulfilled the network node is configured to create a query towards a predetermined network element in order to receive information if it is suitable moment to transfer the message. The query is delivered to a network element in the communication network, such as mobile switching centre, which is aware of the network status. According to some embodiment of the invention the query may request the general status of the network or status of a certain network cell, for example. Depending on the implementation the network element may just respond YES or NO for indicating if the network node managing the presence information message is allowed to transfer the messages or not. Alternatively or in addition, the network node may receive some details of the operation of the network or part of it, such as a cell, as a response to the query and the network node may be configured to analyze, by means of a predetermined criteria, if it is appropriate time to deliver the messages or not.

According to another example of the invention the scheduling of the presence information messages may be configured to depend on a location of the client terminal, and thus the user of the client terminal. It may be arranged that the user can define the locations in which he or she is willing to receive the presence information messages. For example, if the presence application running in the client terminal is work-related, the user may want to receive the messages only at a working location. The user may select the area with the presence application or any map application which is arranged to communicate with the presence application or with the network node, and the information is conveyed and stored in the network node controlling the presence information management. Now, the network node may be configured to, before transferring the messages, to query the location of each of the client terminal belonging to the presence service from the telecommunication network. The telecommunication network may provide the location information on a cell basis, for instance. The network node compares if the location information of the client terminal matches with the location in which the presence information messages are allowed. If this is the case, the network node may deliver the message to the client terminal.

Furthermore, in some embodiment of the invention the presence information messages are prioritized in some predefined manner. This means that the presence information message comprises information, such as a data element, indicating the priority of one presence information message compared to others. The priorities may also be defined on user basis which enables for example VIP users with higher priority in the presence messages. In other words, a client terminal 200, i.e. the watcher, may e.g. set presentities belonging to his or her account into different order of importance i.e. priority, which has an effect on the schedule of transfer of the messages. The network node may be configured to analyze the priorities of the presence information messages, i.e. analyze the presentities who has delivered the presence information messages to the network node 200, and set the transfer order of the messages according to priorities. The priority order of the presentities is configured to be maintained in the network node 200 on a client terminal 250, i.e. watcher, basis.

Alternatively or in additionally, the network node may comprise, i.e. maintain for use, sophisticated rules in order to trigger the transfer of the presence information messages. The network node may be configured to check the status of the communication environment, such as network congestion, and if the congestion level is above a certain predetermined level, the network node may be configured to transfer only those presence information messages which are prioritized above a certain predetermined priority level. Any other parameter than the congestion level which is configured to represent the communication environment may also be used for defining the transfer order of the presence information messages as described. The rule, i.e. criteria, may be defined to meet the operational requirements of the presence service. In other words, at least one presence information message of a certain predetermined priority level, which meets at least one predetermined criterion, is configured to be transferred under a predetermined communication environment.

For example, the presence information service may be applied in alarm systems. The target under monitoring is configured to deliver so called normal status messages through the presence information service according to certain predetermined schedule. As the messages are prioritized as "normal", the messages may not be sent if the network traffic is above a certain level. On a contrary, if the alarm system gives an alarm, the alarm message is prioritized into to category "important" and when such a message is delivered to the network node running the presence service, the network node detects the importance of the message and it is configured to transfer the presence information message immediately without performing any communication environment check-ups. Alternatively, it may be arranged that even if the communication environment is checked, any possible information preventing the transfer of presence information messages due to a challenge in the communication environment may be overruled in response to detection of a prioritized message by the network node and the important presence information message may be triggered. The above described implementation is applicable with many different environments. For example, it may be arranged that a user may set different prioritization on a contact-by-contact basis. Thus, some presence information messages may be received even if the communication environment is detected to be somehow limited.

Furthermore, the presence information messages may be equipped with a priority indicator. Thus, the network node may be configured to compare the priority indicators of different presence information messages and, on a basis of predetermined rules, to transfer the presence information accordingly. For example, the presence information messages with the higher priority may be delivered prior to lower priority.

Alternatively or in addition, the network node may be arranged to, in response to the analysis of the communication environment, instruct one or more client terminals to postpone the delivery of presence information messages as long as some criteria is fulfilled. Such criteria may e.g. be at least one of the following: period of time, location of a client terminal, activation message from a network side, and so on. Such a feature would be advantageous in e.g. big events, such as concerts, in which there can be thousands of client terminals within a limited area. Thus, in order to maintain the network capacity the network node for the presence services may be arranged to instruct the client terminals as described.

Above it is described that the communication environment comprises of information from a client terminal and a communication network. The invention as such does not require information from both of the mentioned sources. Information from only one of the sources is enough to achieve the operation of the invention as described.

Figure 3:
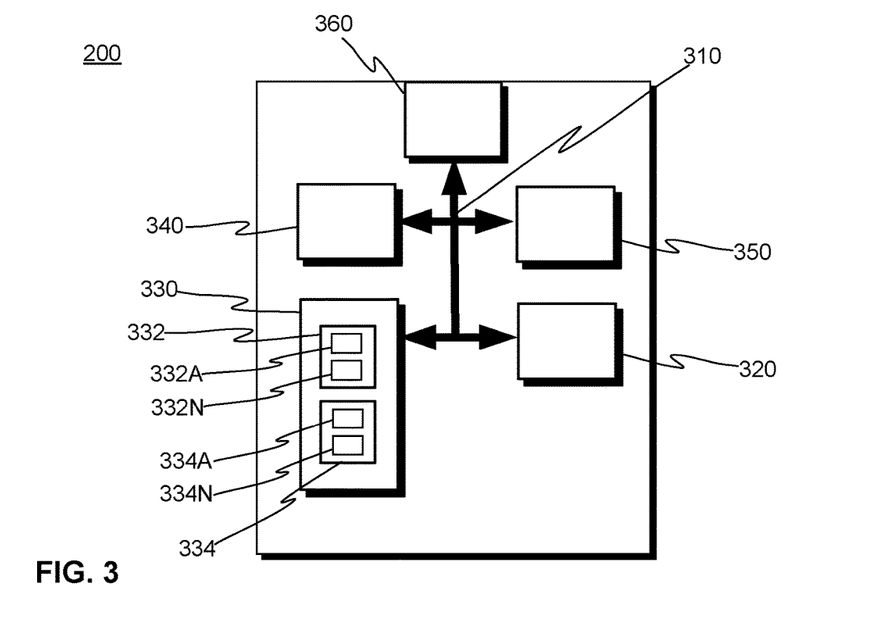
FIG. 3 illustrates an example of a network node according to the invention.

FIG. 3 discloses an example of a network node 200 according to an implementation consistent with the principles of the invention. The network node 200 comprises, for example, a bus 310, a processor 320, a memory 330, input means 340, output means 350, and a communication interface 360. The bus 310 may include means or methods that enable communication among the elements of the network node 200.

The processor 320 may comprise one or more conventional processors, one or more microprocessors, or one or more processing logics, or any combination of these, that interprets and executes instructions defined by portions of computer program code. The memory 330 may comprise a random access memory (RAM) 332 and/or a read only memory (ROM) 334. The RAM 332 may store information and instructions in a form of portions of computer program code 332A-332N for execution by the processor 320. The ROM 334 may include a conventional ROM device or another type of a static storage device that is configured to store static information and instructions in a form of portions of computer program code 334A-334N for use by the processor 320. The RAM 332 and ROM 334 may be implemented with one or more corresponding memory elements. For example, the presence status updates of presentities may be stored to at least one memory element as described. Also the limits for determining the status of the communication environment are preferably stored in the memory.

The input means 340 may comprise a conventional mechanism that permits inputting information to the network node 200, such as a keyboard, a mouse, a pen, a touch screen, voice recognition and/or biometric mechanisms, etc. The output means 350 may comprise a conventional mechanism that outputs information, including a display, a printer, a speaker, etc. The input and output means are not necessarily implemented into the network node 200, but may be coupled to the network node 200 with some known interfaces either wirelessly or in a wired manner, e.g. by utilizing the communication interface 360.

The communication interface 360 may enable the network node 200 to communicate with other nodes and/or systems, such as networks, as well as with client terminals either directly or indirectly over a network. Thus, the communication interface 360 may comprise one or more communication modems and other elements to, under at least partial control of the processor, communicate with external entities.

The network node 200 may perform the operations as described above in response to the processor 320 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 360. The software instructions may cause the processor 320 to perform method steps and processes as described and thus to enable the operation of the network node 200 as described.

FIG. 3 illustrates an example of the network node 200 according to the invention. The elements disclosed in FIG. 3 do not necessarily exist in all implementations of the network node 200. For example, the network node 200 may not comprise input means 340 and output means 350, but the network node 200 may be accessed through the communication interface 360 with applicable devices and systems. As well, the number and type of memories may vary. As well, the amount of portions of computer program code may depend on the implementation.

Figure 4:
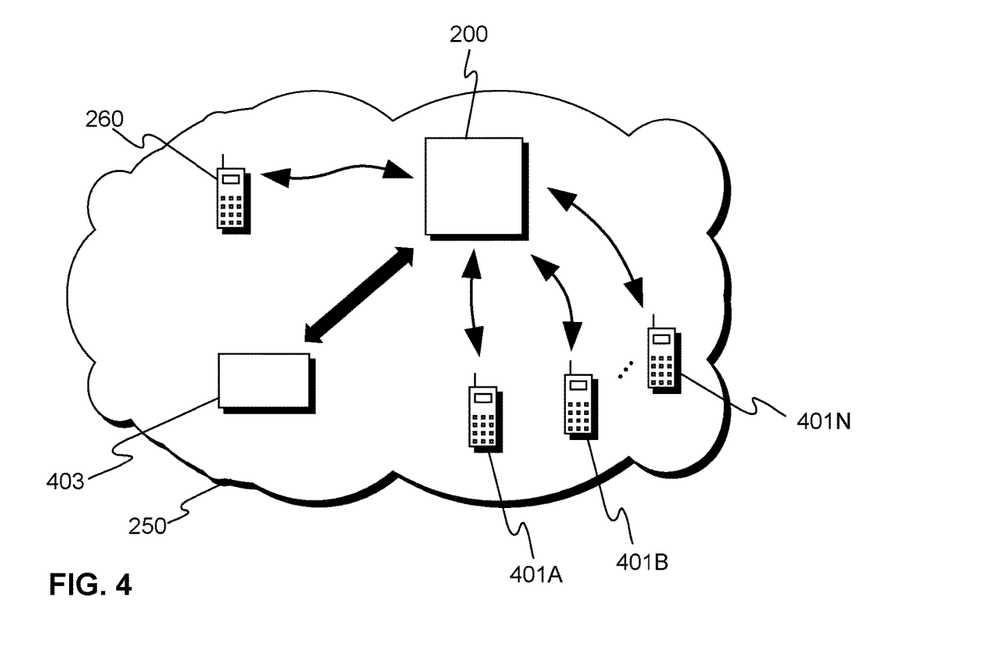
FIG. 4 illustrates an example of a system according to the invention.

FIG. 4 illustrates a system according to an example of the invention. The system comprises a network node 200 for maintaining presence information messages, and especially updates thereto, and communicating either directly or indirectly with other entities. The other entities in the system may e.g. be one or more client terminals 401A-401N, which are configured to transfer one or more presence information messages to the network node 200. The communication with respect to the presence information messages may preferably be arranged over a communication network 250, such as mobile communication network. Other network units for enabling the communication, such as base stations and necessary subscriber registers are not illustrated in FIG. 4. As the network node 200 is triggering a transfer of the presence information messages received from the client terminals 401A-401N it is configured to clarify the status of the communication environment prior to the transfer of messages. The clarification of the communication environment may be arranged by analyzing information received from a client terminal 260, which is the target for the presence information messages, and/or from a communication network 250 in which the transfer of the presence information message is at least partly configured to be executed. The network node 200 is configured to communicate with a network element 403, which is configured to maintain information on the communication environment in the network 250 side, in order to receive information on the communication environment. The network node 200 is configured to analyze the information on the communication environment received from the client terminal 260, i.e. so called watcher, and the network element 403, and in response to the analysis it is configured to determine if the communication environment is suitable for the transfer of presence information message to the client terminal 260. In response to a positive outcome of the determination the network node is configured to trigger the transfer of the presence information messages. The analysis which is at least partly configured to be performed by the network node 200 comprises at least comparing one or more parameters to one or more predetermined values, i.e. limits. If the parameter value or values meet the limits in a predefined manner, the outcome of the analysis can be determined.

The communication channel between the client terminal 260 i.e. watcher and/or the other client terminals 401A-401N, i.e. presentities, and the network node 200 may be implemented in several ways. According to a first embodiment the entities may communicate over so called Session Initiation Protocol (SIP) which protocol can be used for creating, modifying and terminating two-party or multiparty sessions. Alternatively, the functionality as described may be arranged with Rich Communication Suite (RCS) and especially with enhanced messaging as well as enhanced phonebook with presence information. As the RCS utilizes the capabilities of IP Multimedia Subsystem (IMS) the authentication, authorization and routing, for example, can be provided easily. In addition, the entities may communicate using the XML Configuration Access Protocol (XCAP) which is generally used to read, write and modify data stored in Extensible Markup Language (XML) format.

The system according to the invention is configured to monitor the communication environment either in the client terminal, i.e. the watcher, or in the network node or in both of them. The network node may analyze the information on the communication environment and determine the most appropriate timing for the transfer of the presence information message, as described earlier in the document.

Herein it is mainly used a term presence information or presence information message to indicate information element by means of which presence information can be transferred between the mentioned elements. The term shall be understood to refer any signaling or messaging between the mentioned elements without any limitation. The purpose is at least to transfer information relating to presentity to a watcher. Typically such information is a presence information update performed by the presentity in question. The number of the presence information messages is not relevant from the invention point of view. It may be arranged that each of the presence information update produces a message or alternatively information on the updates are included into one presence information message. Thus, the terms message or messages in this context shall be interpreted to cover one or more messages comprising information on the presence of a user of the presence service.

Some advantageous embodiments according to the invention were described above. The invention is not limited to the embodiments described. The inventive idea can be applied in numerous ways within the scope defined by the claims attached hereto.

The invention claimed is:

1. A method for controlling transfer of at least one presence information message between a network node and a client terminal over a mobile communication network, the network node and the client terminal being configured to communicate with each other over the mobile communication network, the method comprising:
at a presence control node in communication with the mobile communication network, receiving network traffic condition information indicative of a condition of a communication environment of the mobile communication network for communicating the presence information message to the client terminal, the network traffic condition information being received from at least one of the following:
the mobile communication network,
and the client terminal;
analyzing, at the presence control node, the received network traffic condition information at least by comparing the received network traffic condition information at least partially with at least one predetermined value;
determining, at the presence control node, as a result of the analyzing step, that a condition of the communication environment is suitable for the transfer of the presence information message when the comparison of the received network traffic condition information is satisfied in the analyzing step in view of the at least one predetermined value;
upon a determination, in the determining step, that the communication environment is suitable for the transfer of the at least one presence information message, requesting a permission from a traffic management element, which is connected to the presence control node and is configured to maintain information on the communication environment in the mobile communication network, to trigger the transfer of the presence information message, and in response to a receipt of the permission, triggering the transfer of the presence information message so that the presence information message is caused to be transferred via the mobile communication network to the client terminal; and
upon a determination, in the determining step, that the communication environment is not suitable for the transfer of the at least one presence information message as a result of the comparison of the received network traffic condition information not being satisfied in the analyzing step, at least temporarily preventing the triggering of the transfer of the presence information message and at least temporarily storing, at the traffic management element, the presence information.

2. The method as claimed in claim 1, wherein the presence control node and the traffic management element are connected to each other via a core network, and the traffic management element manages traffic in the mobile communication network.

3. The method as claimed in claim 1, wherein the traffic management element is a mobile switching centre for the mobile communication network.

4. The method as claimed in claim 1, wherein the network traffic condition information on the communication environment with respect to the mobile communication network comprises at least one of the following:
an activity status of the client terminal, a congestion status of the mobile communication network, a quality of a communication channel of the mobile communication network, a radio access technology the client terminal is currently utilizing, and a roaming status of the client terminal in the mobile communication network.

5. The method as claimed in claim 1,
wherein the transfer of at least one presence information message to the client terminal is triggered according to a priority order of presentities, and
wherein the priority order of the presentities is maintained in the presence control node on the client terminal basis.

6. The method as claimed in claim 1, the method further comprising:
comparing a first indicator in a first presence information message to a second indicator in at least one second presence information message; and
causing a transfer of the first and second presence information messages in accordance with a priority order maintained in a memory of the presence control node.

7. The method as claimed in claim 6, wherein the first and second presence information messages are caused to be transferred in accordance with a predetermined priority level corresponding to a predetermined condition of the communication environment of the mobile communication network.

8. The method as claimed in claim 1, wherein the network traffic condition information on the communication environment with respect to the client terminal comprises at least one of the following:
a user profile set in the client terminal, a time of day, a type of the mobile communication network into which the client terminal is attached, a movement of the client terminal, a type of the movement of the client terminal, a status of a screen lock of the client terminal, a status of a Wi-Fi radio in the client terminal, a location of the client terminal, and a battery status of the client terminal.

9. A presence control node, comprising:
a processor;
a memory including at least one portion of computer program code; and
a communication interface for communication with a mobile communication network, the memory and the at least one portion of computer program code configured to, with the processor and communication interface, cause the presence control node to
receive network traffic condition information, via the communication interface, indicative of a condition of a communication environment of the mobile communication network for communicating the presence information message to a client terminal in communication with the presence control node via the mobile communication network, the network traffic condition information being received from at least one of the following: the mobile communication network and the client terminal;

analyze the received network traffic condition information at least by comparing the received network traffic condition information at least partially by comparing the received network traffic condition information with at least one predetermined value;

determine, as a result of the analyzing, whether a condition of the communication environment is suitable for the transfer of the presence information message based on whether the comparison of the received network traffic condition information is satisfied in the analyzing step in view of the at least one predetermined value;

upon a determination, in the determining step, that the comparison indicates that the communication environment is suitable for the transfer of the at least one presence information message, requesting a permission from a traffic management element of the mobile communication network, which is connected to the presence control node via a core network and manages traffic in the mobile communication network, to trigger the transfer of the presence information message, and in response to a receipt of the permission, triggering a transfer of the presence information message to the client terminal so that the presence information message is caused to be transferred over the mobile communication network to the client terminal; and upon a determination, in the determining step, that the communication environment is not suitable for the transfer of the at least one presence information message as a result of the comparison of the received network traffic condition information not being satisfied in the analyzing step, at least temporarily preventing the triggering of the transfer of the presence information message and at least temporarily storing, at the traffic management element, the presence information.

10. The presence control node as claimed in claim 9, wherein the transfer of the at least one presence information message to the client terminal is triggered according to a priority order of presentities, and wherein the priority order of the presentities is maintained in the memory of the presence control node on a client terminal basis.

11. The presence control node as claimed in claim 9, wherein the program code is further configured to cause the presence control node to compare a first indicator in a first presence information message to another indicator in at least one second presence information message, and cause a transfer of the first and second presence information messages in accordance with a priority order maintained in a memory of the presence control node.

12. The presence control node as claimed in claim 9, wherein the program code is further configured to cause the presence control node to transfer at least one presence information message of a certain pre-determined priority level under a predetermined communication environment.

13. A system, comprising:
a mobile communication network;
a presence control node in communication with the mobile communication network;
a traffic management element in communication with the presence control node, the traffic management element being aware of a network status of the mobile communication network and configured to manage a traffic in the mobile communication network; and
at least one client terminal, in communication with the mobile communication network, that exchange presence information in the system;
wherein the presence control node is configured to
receive network traffic condition information concerning a condition of the mobile communication network for exchanging the presence information, the network traffic condition information being received from at least one of the following: the mobile communication network and the at least one client terminal;
analyze the received network traffic condition information at least by comparing the received network traffic condition information at least partially with at least one predetermined value stored at the presence control node;
determine, as a result of the comparing of the received network traffic condition information at least partially with at least one predetermined value stored at the presence control node, that a condition of a communication environment of the mobile communication network is suitable for the transfer of a presence information message when the comparison of the received network traffic condition information is consistent with the at least one predetermined value;
upon a determination that the communication environment is suitable for the transfer of the at least one presence information message, requesting a permission from the traffic management element to trigger the transfer of the presence information message, and in response to a receipt of the permission, triggering a transfer of the presence information message via the communication network so that the presence information message is caused to be transferred via the mobile communication network to the at least one client terminal; and
upon a determination that the communication environment is not suitable for the transfer of the at least one presence information message as a result of the comparison of the received network traffic condition information not being satisfied by the analyzing of the received network traffic condition information, at least temporarily preventing the triggering of the transfer of the presence information message and at least temporarily storing, at the traffic management element, the presence information.

14. The system as claimed in claim 13, wherein the traffic management element is a mobile switching center (MSC) of the mobile communication network.

15. The method as claimed in claim 1, wherein the network traffic condition information comprises at least one of the following:
a congestion status of the communication network, a quality of communication channel, a radio access technology the client terminal is currently utilizing, and a roaming status of the client terminal in the communication network.

16. The presence control node as claimed in claim 9, wherein the network traffic condition information comprises at least one of the following:

a congestion status of the communication network, a quality of communication channel, a radio access technology the client terminal is currently utilizing, and a roaming status of the client terminal in the communication network.

17. The system as claimed in claim 13, wherein the network traffic condition information comprises at least one of the following:

a congestion status of the communication network, a quality of communication channel, a radio access technology the at least one client terminal is currently utilizing, and a roaming status of the at least one client terminal in the communication network.

18. The method as claimed in claim 1, wherein, upon triggering the transfer of the presence information message as a consequence of a determination that the communication environment is suitable for the transfer of the at least one presence information message, the presence control node causes the presence information message to be transferred from a presentity node in communication with the communication network to the client terminal via the communication network.

19. The presence control node as claimed in claim 9, wherein the triggering transmits a signal over the mobile communication network configured to cause a presentity node in communication with the communication network to transmit at least one presence information message to the client terminal.

20. The system as claimed in claim 13, wherein the triggering transmits a signal over the mobile communication network configured to cause a presentity node in communication with the communication network to transmit at least one presence information message to the at least one client terminal.

\* \* \* \* \*